Patented May 11, 1937

2,079,926

UNITED STATES PATENT OFFICE 2,079,926

ARTIFICIAL RESIN AND METHOD OF PRODUCING SAME

Israel Rosenblum, Jackson Heights, N. Y.

No Drawing. Application January 2, 1930, Serial No. 418,162. Renewed December 12, 1935

13 Claims. (Cl. 260—4)

My invention relates to artificial resins of highly complex character which are compatible with oil varnishes and with so-called nitrocellulose lacquers and are capable of producing tough, transparent, durable, weather and waterproof and strongly adherent films.

It is an object of the present invention to produce an artificial resin of semi-plastic nature, wide range of solubility in the common, and especially in the less expensive, varnish and lacquer solvents, and capable of mixing thoroughly with oil varnishes and nitrocellulose (cellulose nitrate) and other cellulosic lacquers to form a clear and homogeneous film. Other objects will appear from the following description and the features of novelty will be pointed out in the claims.

In my United States Patent No. 1,808,716, dated June 2, 1931, I have described a method of producing resinous complexes of high molecular weight, low viscosity, and wide range of solubility suitable for use in varnishes and lacquers by reacting a phenol-aldehyde-organic salt complex with mono- and di-glycerides of natural resin acids to produce a phenol-aldehyde-organic salt-resin acid glyceride complex.

In accordance with the present invention, I produce novel and valuable resinous products by adding to a heated mass of a phenol-aldehyde-organic salt complex and rosin a quantity of the mono- and di-glycerides of fatty acids and heating the mixture until a highly complex resinous mass is produced, which might be designated as a substantially neutral mixture of mixed tri-glycerides of the fatty acid, the phenol-aldehyde-organic salt-rosin complex, and rosin.

It will be noted that I refer to a phenol-aldehyde-organic salt-rosin complex. It is, of course, impossible to assign definite chemical formulas to these complex resinous bodies as their composition and structure are not yet known, and it is, therefore, difficult, if not impossible, to state definitely the relation between the rosin and the phenol-aldehyde-organic salt complex. I have observed, however, that rosin and other natural resins, when heated even at low temperatures with the phenol-aldehyde-organic salt complex, are modified in character in certain important respects and will, for example, produce gums of lower viscosity and better solubility (as in mineral spirits).

In carrying out my invention, I cause a phenol, such as carbolic acid or a homologue thereof, or a mixture of phenols, to react with an aldehyde, such as formaldehyde or acetaldehyde, or a mixture of aldehydes, in the presence of an organic salt of a metal and of a natural resin, such as rosin, until a fusible, soluble, resinous condensate, which I term a phenol-aldehyde-organic salt-natural resin complex, is formed. The organic salt may be the resinate, abietate, oleate, tungate, stearate, acetate, etc. of zinc, calcium, barium, strontium, manganese, lead, cobalt, and in certain instances the corresponding salts of the alkali metals, etc. I prefer to employ an organic salt of zinc of high molecular weight, preferably a resinate, such as zinc abietate. I prefer to form the initial condensate in the presence of a solvent, such as rosin; if rosin is not used as the solvent, it may be added after the condensate is formed. The reaction mass containing the phenol-aldehyde-organic salt- natural resin complex is then heated, and a quantity of mono- or di-glyceridic esters of a fatty acid, preferably an acid of high molecular weight, such as linoleic or oleic acid, is then added and the heating continued until a resinous mass of low acid number (10 or below) is obtained. It will be understood that the quantity of partial glycerol esters to be employed is that sufficient to neutralize the acidic phenol-aldehyde-organic salt-rosin complex and any free rosin that may be present.

The following are typical of the more or less neutral mixed esters that are probably formed, at least during the early stages of the reaction:

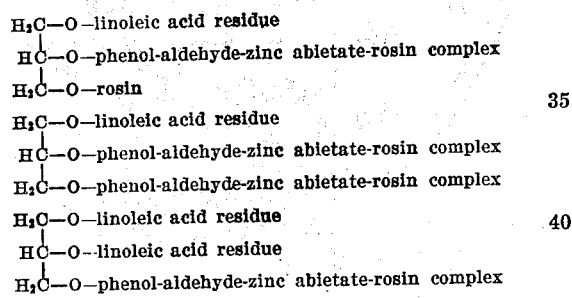

Other natural resins may be employed, either partially or wholly in place of rosin, such as the fossil resins, congo, dammar, pontiac, etc., or mixtures of natural resins may be employed, in which case tri-glycerides of the following type will be obtained:

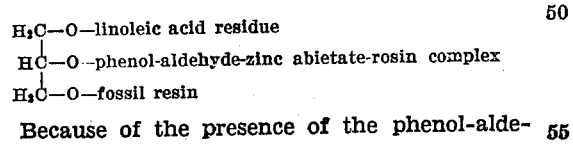

Because of the presence of the phenol-aldehyde-organic salt complex, the final reaction may take place at lower temperatures than those usually employed for the neutralization of phenol-formaldehyde rosin condensates (minus the salt) with glycerol because no intermediate compounds, which appear to be of a ketonic or lactonic nature and are more or less crystalline and insoluble in certain solvents, such as ethyl acetate, are formed which must be destroyed at comparatively high temperatures.

The rosin and fossil resins may be cracked or dry distilled before they are employed in the reactions indicated above, but, while this is in general desirable, it is not essential. I prefer to use rosin in the uncracked condition as its behavior is favorably modified by the phenol-aldehyde-organic salt complex.

Depending upon the proportion of the phenol-aldehyde condensate present, and upon the temperature and the time consumed in the reaction, there are obtained resins or gums of high solubility which are compatible with nitrocellulose lacquers or oil varnishes.

Any of the fatty acids, or mixtures thereof, may be employed to produce the mono and diglycerides mentioned above, but I prefer to use the acids of high molecular weight, such as oleic, stearic, palmitic, linoleic, ricinoleic, linolenic, myristic, the acids obtained upon hydrolysis of China-wood oil and other edible, non-edible, drying and non-drying oils, etc.; in general, I may employ any partial ester of a polyhydric alcohol which is a solvent for the other substances present or produces such a solvent upon complete esterification thereof with one or more of the acidic substances present.

I shall now describe in detail several satisfactory procedures for carrying out my invention, but the same are to be understood as being given by way of example only and not by way of limitation.

*Example 1*

300 pounds of dry distilled colophony are heated with 10 pounds of phenol or cresol and 20 pounds of an aqueous formaldehyde solution (40%) at a temperature of about 110° C. under a slight pressure in the presence of 5 pounds of zinc rosinate. The water of the solution and of reaction is then distilled off. 280 pounds of monolinoleic glycerol ester are added and esterification is continued by raising the temperature to 260° C. under pressure or vacuum. A semi-solid gum of low acid value is obtained which has remarkable water and weatherproofing properties when made into varnish.

*Example 2*

Same as Example 1, with the exception that, instead of monolinoleic, monostearic glycerol ester is used.

*Example 3*

150 pounds of colophony, 6 pounds of phenol or cresol, 12 pounds of aqueous formaldehyde (40%), and 3 pounds of zinc rosinate are heated to about 105° C., until the condensation is substantially complete. The water is syphoned off and 200 pounds of dry distilled congo gum or fossils are added and also 270 pounds of monostearic or monolinoleic glycerol ester. The temperature is raised to about 240° C. and esterification continued with pressure or vacuum. A gum is obtained which is excellently suited for baking varnishes.

*Example 4*

300 pounds of dilinoleic glycerol ester or distearic glycerol ester and 320 pounds of the acidic mass derived from the interaction of phenol, formaldehyde and zinc rosinate in the presence of colophony, as described in Example 3, are heated to a temperature of about 230°–240° C. Semi-plastic compounds are thus obtained which are soluble in practically all varnish and lacquer solvents suitable for the manufacture of varnishes, and impart to varnishes and lacquers a high durability.

*Example 5*

Instead of mono- or dilinoleic glycerol ester, the mono- and/or di-esters derived from partial esterification of glycerol with the fatty acids of China-wood oil can be used in all former examples.

*Example 6*

All of the glycerol esters mentioned above may be substituted by mono- and/or diricinoleic glycerol esters, or by any mono- and/or die-esters of glycerol and acids derived from drying or non-drying oils and from fats, or by other similarly partially esterified polyhydric alcohols with fatty acids of low or of high molecular weight.

*Example 7*

Instead of producing the final complex gum in stages, as described above, all of the ingredients may be mixed and heated together from the start.

It will be understood that the zinc rosinate specified in the examples may be replaced by one or more other organic salts; if desired, oxides may be used, such as zinc oxide, which in the presence of rosin forms the rosinate.

I desire to call attention to my co-pending application, Serial No. 418,161, filed simultaneously with the present application, and in which is described and claimed the method of treating a phenol-aldehyde-organic salt-natural resin complex with an aryl alcohol, such as may be obtained by partially esterifying glycerol with a substituted aromatic hydrocarbon of acidic nature. The specific invention described in the present application may be regarded as involving the treating of a phenol-aldehyde-organic salt-natural resin complex with a polyhydric alcohol which has been partially esterified with one or more fatty acids (i. e. of the aliphatic series), but I propose to claim broadly in the instant application the treatment of a phenol-aldehyde-organic salt-natural resin complex with a partially esterified polyhydric alcohol.

Variations may be resorted to within the scope of the appended claims without departing from the spirit of the invention.

What is claimed is:

1. The method which comprises condensing a phenol, an aldehyde, an organic salt of zinc, and a polyhydric alcohol which has been partially esterified with a fatty acid, in the presence of a natural resin.

2. The method which comprises condensing a phenol, an aldehyde, and an organic salt of zinc in the presence of a natural resin, and then neutralizing the resulting mass with glycerol which has been partially esterified with a fatty acid.

3. The method which comprises condensing phenol and formaldehyde in the presence of an organic salt of zinc and rosin, and then neutralizing the resulting condensate with a partial ester of glycerol and a fatty acid derived from a fatty oil.

4. The method which comprises condensing phenol, formaldehyde, a zinc salt of a natural resin acid, a natural resin, and a partial ester of glycerol and an acid obtainable upon hydrolysis of a drying oil until a homogeneous oil-soluble mass is obtained.

5. The oil-soluble reaction product of phenol, formaldehyde, a zinc salt of a natural resin acid, a natural resin, and a partial ester of glycerol and an acid obtainable upon hydrolysis of a drying oil.

6. The method of producing resinous compositions suitable for the manufacture of oil varnishes which comprises condensing a phenol and an aldehyde in the presence of a natural resin and then further heating the mass at higher temperatures with a polyhydric alcohol which has been partially esterified with a carboxylic organic acid and thus contains free hydroxyl groups.

7. The method according to claim 6 wherein the proportions of the reacting materials is such that a product of low acid number is obtained.

8. The method of producing resinous compositions suitable for the manufacture of oil varnishes which comprises condensing a phenol, an aldehyde and a polyhydric alcohol which has been partially esterified with a high molecular weight monobasic fatty acid, in the presence of a natural resin.

9. The method of producing resinous compositions suitable for the manufacture of oil varnishes which comprises condensing a phenol and an aldehyde in the presence of an acidic natural resin, and then substantially neutralizing the resulting mass with glycerol which has been partially esterified with a high molecular weight monobasic fatty acid.

10. The method of producing resinous compositions suitable for the manufacture of oil varnishes which comprises condensing phenol and formaldehyde in the presence of rosin, and then neutralizing the resulting condensate with a quantity of glycerol which has been partially esterified with from one to two mols of a monocarboxylic acid for each mol. of glycerol.

11. The method of producing resinous compositions suitable for the manufacture of oil varnishes which comprises condensing phenol and formaldehyde in the presence of rosin, and then neutralizing the resulting condensate with a partial, basic hydroxyl containing glycerol ester of a high molecular weight fatty acid obtainable from a fatty oil.

12. A resinous composition suitable for the manufacture of oil varnishes and comprising the reaction product of (1) the condensate of a phenol, formaldehyde and an acidic natural resin, and (2) a partial, basic hydroxyl-containing ester of glycerol and a carboxylic organic acid.

13. A resinous composition suitable for the manufacture of oil varnishes and comprising the reaction product of (1) the condensate of a phenol, formaldehyde and an acidic natural resin, and (2) a partial, basic hydroxyl-containing glycerol ester of a high molecular weight fatty acid obtainable on hydrolysis of a drying oil.

ISRAEL ROSENBLUM.